United States Patent
Ienaga (10) Patent No.: US 9,889,743 B2
(45) Date of Patent: Feb. 13, 2018

(54) VEHICLE CONTROL DEVICE AND VEHICLE CONTROL METHOD

(71) Applicant: FUJI JUKOGYO KABUSHIKI KAISHA, Tokyo (JP)

(72) Inventor: Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 183 days.

(21) Appl. No.: 14/855,231

(22) Filed: Sep. 15, 2015

(65) Prior Publication Data

US 2016/0089982 A1 Mar. 31, 2016

(30) Foreign Application Priority Data

Sep. 30, 2014 (JP) ................................. 2014-200743

(51) Int. Cl.
*B60L 3/10* (2006.01)
*B60L 15/20* (2006.01)

(52) U.S. Cl.
CPC ........... *B60L 3/102* (2013.01); *B60L 15/2036* (2013.01); *Y02T 10/7275* (2013.01)

(58) Field of Classification Search
CPC ... B60L 3/102; B60L 15/2036; Y02T 10/7275
See application file for complete search history.

(56) References Cited

U.S. PATENT DOCUMENTS

| 2007/0095593 A1* | 5/2007 | Peterson | B60W 40/103 180/248 |
| 2013/0226388 A1 | 8/2013 | Kikuchi et al. | |
| 2015/0203117 A1* | 7/2015 | Kelly | B60K 31/02 701/91 |
| 2015/0203123 A1* | 7/2015 | Darnell | B60W 50/082 701/37 |

(Continued)

FOREIGN PATENT DOCUMENTS

| CN | 103209858 A | 7/2013 |
| CN | 103318051 A | 9/2013 |

(Continued)

OTHER PUBLICATIONS

Office Action Received for Chinese Patent Application No. 201510608196.7, dated Mar. 9, 2017, 6 Pages of Office Action Including 7 Pages of English Translation.

*Primary Examiner* — Mussa A Shaawat
(74) *Attorney, Agent, or Firm* — Chip Law Group (57) ABSTRACT

A vehicle control device includes motors that respectively drive front and rear, left and right wheels independently, wheel speed sensors that detect rotation speeds of the respective wheels, motor rotation speed sensors that detect rotation speeds of the motors corresponding to the respective wheels, a slip determination module that sets, as a base rotation speed, a lowest rotation speed, and performs slip determination on each wheel on the basis of the base rotation speed and the rotation speeds of the motors, a rotation speed control module that performs torque down, and calculates (Continued)

requested torques of the motors from redistributed torques, and a redistribution control module that redistributes a torque down amount of the slipping wheel to a non-slipping wheel to calculate the redistributed torques.

6 Claims, 8 Drawing Sheets

(56) References Cited

U.S. PATENT DOCUMENTS

| | | | | |
|---|---|---|---|---|
| 2015/0232093 | A1* | 8/2015 | Fairgrieve | B60W 30/143 |
| | | | | 701/90 |
| 2016/0082972 | A1* | 3/2016 | Fairgrieve | B60W 10/06 |
| | | | | 701/84 |
| 2016/0090004 | A1* | 3/2016 | Ienaga | B60L 15/2036 |
| | | | | 701/22 |
| 2017/0066448 | A1* | 3/2017 | Hertel | B60W 30/18172 |

FOREIGN PATENT DOCUMENTS

| | | |
|---|---|---|
| JP | H10-295004 A | 11/1998 |
| JP | 2011-130629 A | 6/2011 |

* cited by examiner

VEHICLE CONTROL DEVICE AND VEHICLE CONTROL METHOD

CROSS-REFERENCE TO RELATED APPLICATIONS

The present application claims priority from Japanese Patent Application No. 2014-200743 filed on Sep. 30, 2014, the entire contents of which are hereby incorporated by reference.

BACKGROUND

1. Technical Field

The present disclosure relates to a vehicle control device and a vehicle control method.

2. Related Art

As related art, for example, Japanese Unexamined Patent Application Publication (JP-A) No. H10-295004 discloses the following technique. When only one of four driving wheels is slipping, an output torque that is to be distributed to the slipping wheel if the slip is not generated is distributed to a non-slip wheel located on the same side, left side or right side, of the slipping wheel.

In addition, for example, Japanese Unexamined Patent Application Publication (JP-A) No. 2011-130629 discloses the following technique. In executing differential limiting between the respective wheels (axles) in order to improve the running through performance and stability of an electric vehicle whose front and rear, left and right wheels can be driven independently, a correction torque is computed with a high gain with respect to a rotation difference of the wheels on which differential limiting is executed. The thus obtained value is limited by an upper limit that is computed separately to set the resulting value as a final output value.

However, with the technique disclosed in the above JP-A No. H10-295004, it is determined whether or not each wheel is slipping on the basis of the absolute value of angular acceleration, and when a slip is generated, the torque is distributed by controlling the output torque. Consequently, the distributed motor torque vibrates, resulting in degradation in drivability.

In addition, with the technique disclosed in the above JP-A No. 2011-130629, when the front wheel slips and the rotation speed thereof is increased, feedback control is performed with a high gain so that the response of transferring the torque to the rear wheel can be increased. In this case, because the motors and tires vibrate significantly, it is necessary to limit the torque transfer amount by providing an upper limit. Consequently, it becomes difficult to transfer a sufficient torque at the time of slip generation, and it is difficult to suppress a slip surely.

SUMMARY OF THE INVENTION

The present disclosure has been achieved in view of the above disadvantages, and the present disclosure provides a novel and improved vehicle control device and vehicle control method that can suppress the generation of a slip on each wheel and suppress motor and tire vibrations to increase the drivability in a system that drives each wheel independently.

An aspect of the present disclosure provides a vehicle control device including motors that respectively drive front and rear, left and right wheels independently, wheel speed sensors that detect rotation speeds of the respective wheels, motor rotation speed sensors that detect rotation speeds of the motors corresponding to the respective wheels, a slip determination module that sets, as a base rotation speed, a lowest rotation speed of the rotation speeds of the respective wheels detected by the respective wheel speed sensors, and performs slip determination on each wheel on the basis of the base rotation speed and the rotation speeds of the motors corresponding to the respective wheels, a rotation speed control module that reduces a torque (performs torque down) in a manner that the rotation speed of a slipping wheel becomes equal to a target rotation speed on the basis of a result of the slip determination performed by the slip determination module, and calculates requested torques of the motors that drive the respective wheels from redistributed torques, and a redistribution control module that redistributes a torque down amount of the slipping wheel to a non-slipping wheel to calculate the redistributed torques.

A target rotation speed calculation module that calculates the target rotation speeds of the respective wheels on the basis of the base rotation speed, a steering wheel steering angle, a yaw rate, and a target slip ratio may be further included.

A torque down amount calculation module that calculates the torque down amount of the slipping wheel from a difference between the requested torque and the redistributed torque may be further included.

The redistribution control module may obtain torques of the respective wheels obtained from a target braking force, calculate the redistributed torque of the non-slipping wheel by adding the torque down amount to the torques of the respective wheels obtained from the target braking force, and set, as the redistributed torque of the slipping wheel, the torques of the respective wheels obtained from the target braking force.

The redistribution control module may calculate the redistributed torque of the non-slipping wheel by equally redistributing, to the non-slipping wheel, a value obtained by dividing a total value of the torque down amount of the slipping wheel by a number of the slipping wheels.

Another aspect of the present disclosure provides a vehicle control method including detecting rotation speeds of front and rear, left and right wheels driven by respective motors independently, setting, as a base rotation speed, a lowest rotation speed of the detected rotation speeds of the respective wheels, and performing slip determination on each wheel on the basis of the base rotation speed and the rotation speeds of the motors corresponding to the respective wheels, performing torque down in a manner that the rotation speed of a slipping wheel becomes equal to a target rotation speed on the basis of a result of the slip determination, and calculating requested torques of the motors that drive the respective wheels from redistributed torques, and redistributing a torque down amount of the slipping wheel to a non-slipping wheel to calculate the redistributed torques.

DETAILED DESCRIPTION

Hereinafter, a preferred implementation of the present disclosure will be described in detail with reference to the appended drawings. Note that, in this specification and the appended drawings, structural elements that have substantially the same function and structure are denoted with the same reference numerals, and repeated description of these structural elements is omitted.

Figure 1:
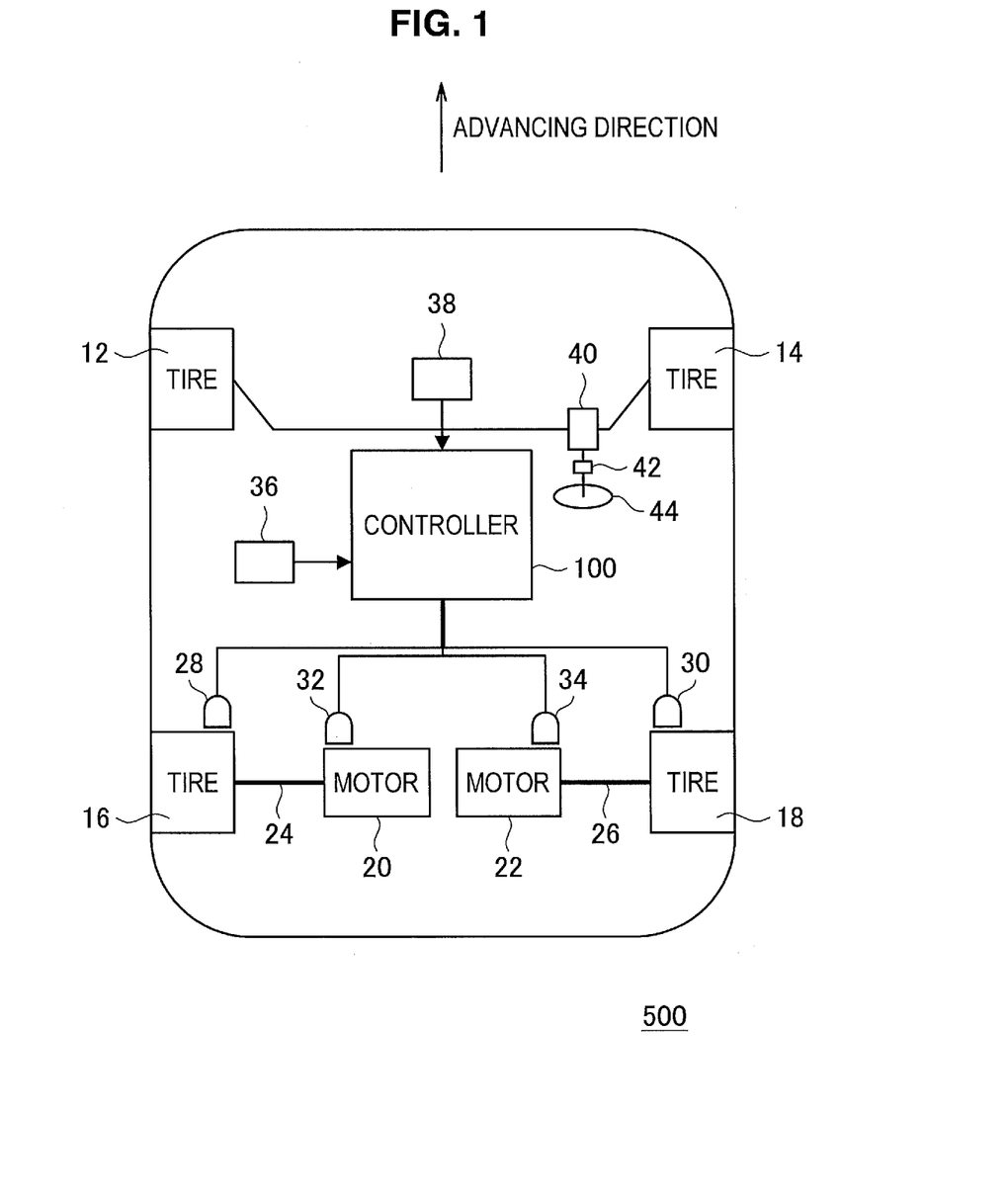
FIG. 1 is a schematic diagram illustrating the configuration of a vehicle according to an implementation of the present disclosure.

First of all, with reference to FIG. 1, the configuration of a vehicle 500 according to the implementation of the present disclosure will be described. FIG. 1 is a schematic diagram illustrating the configuration of the vehicle 500 according to the implementation of the present disclosure. As illustrated in FIG. 1, the vehicle 500 includes four front and rear tires (wheels) 12, 14, 16 and 18, a vehicle control device (controller) 100, two motors (drive units) 20 and 22 that control the rotation of the respective rear wheel tires 16 and 18, drive shafts 24 and 26 that couple the respective motors 20 and 22 with the respective tires 16 and 18, wheel speed sensors 28 and 30 that detect wheel speeds of the respective rear wheel tires 16 and 18 from the rotation thereof, motor rotation speed sensors 32 and 34 that detect rotation speeds of the respective motors 20 and 22, an acceleration sensor 36, and a yaw rate sensor 38. The vehicle 500 further includes, as in the rear wheel part, two motors (drive units) that control the rotation of the respective front wheel tires 12 and 14, drive shafts that couple the respective motors with the respective tires 12 and 14, wheel speed sensors that detect wheel speeds of the respective front wheel tires 12 and 14 from the rotation thereof, and motor rotation speed sensors that detect rotation speeds of the respective motors of the front wheels. The wheel speed sensors of the respective wheels detect tire rotation speeds (wheel speeds) N_wheel (FL, FR, RL, RR) of the respective wheels. The motor rotation speed sensors of the respective wheels detect motor rotation speeds N_motor (FL, FR, RL, RR) of the respective wheels. The vehicle 500 further includes a power steering mechanism (P/S) 40, a steering angle sensor 42, and a steering wheel 44 that operates steering angles of the respective front wheel tires 12 and 14. The vehicle 500 is configured as an electric vehicle that independently drives the four tires (12, 14, 16, and 18).

Figure 2:
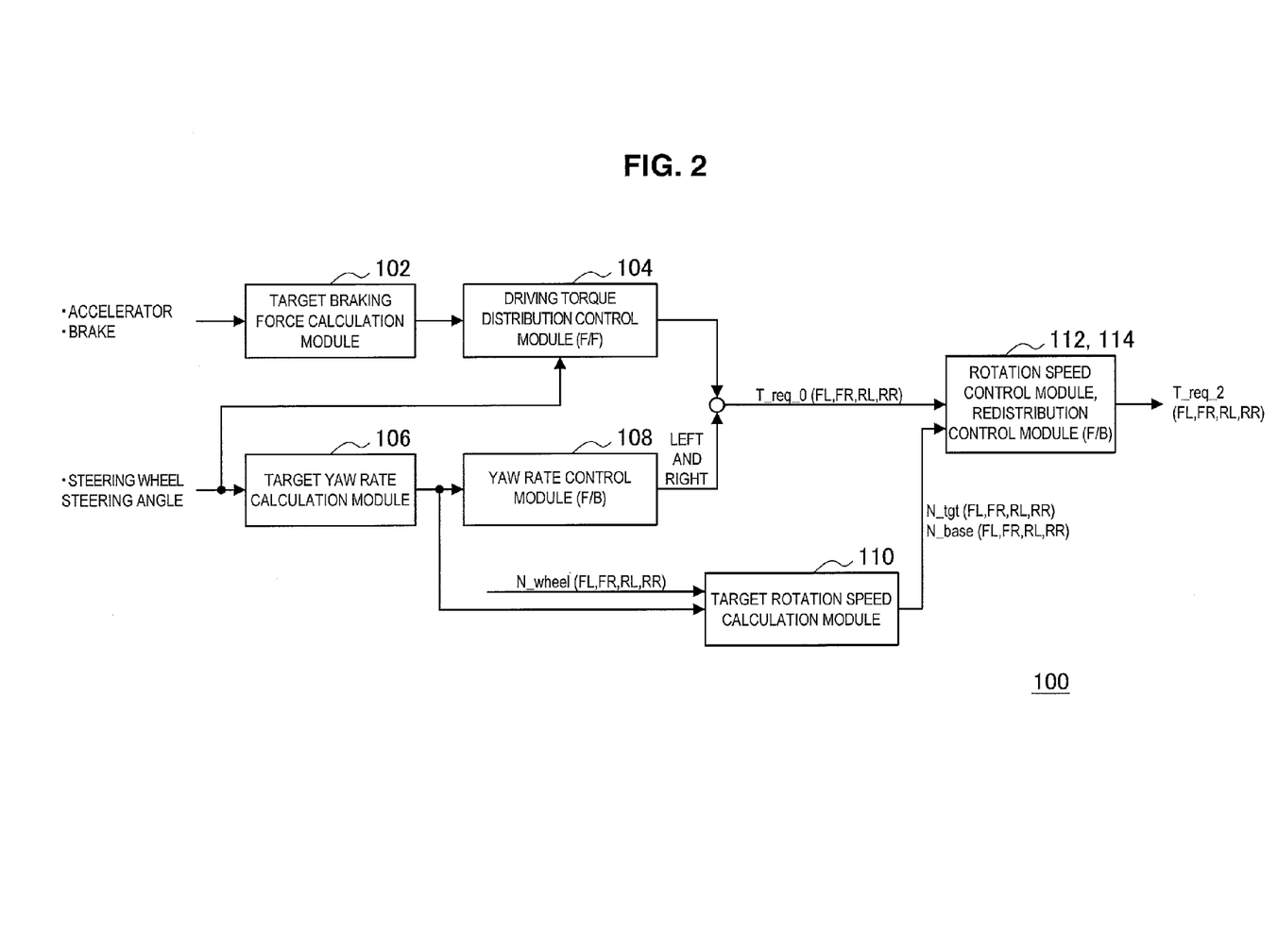
FIG. 2 is a schematic diagram illustrating the entire configuration of a vehicle control device according to the present implementation.
Figure 3:
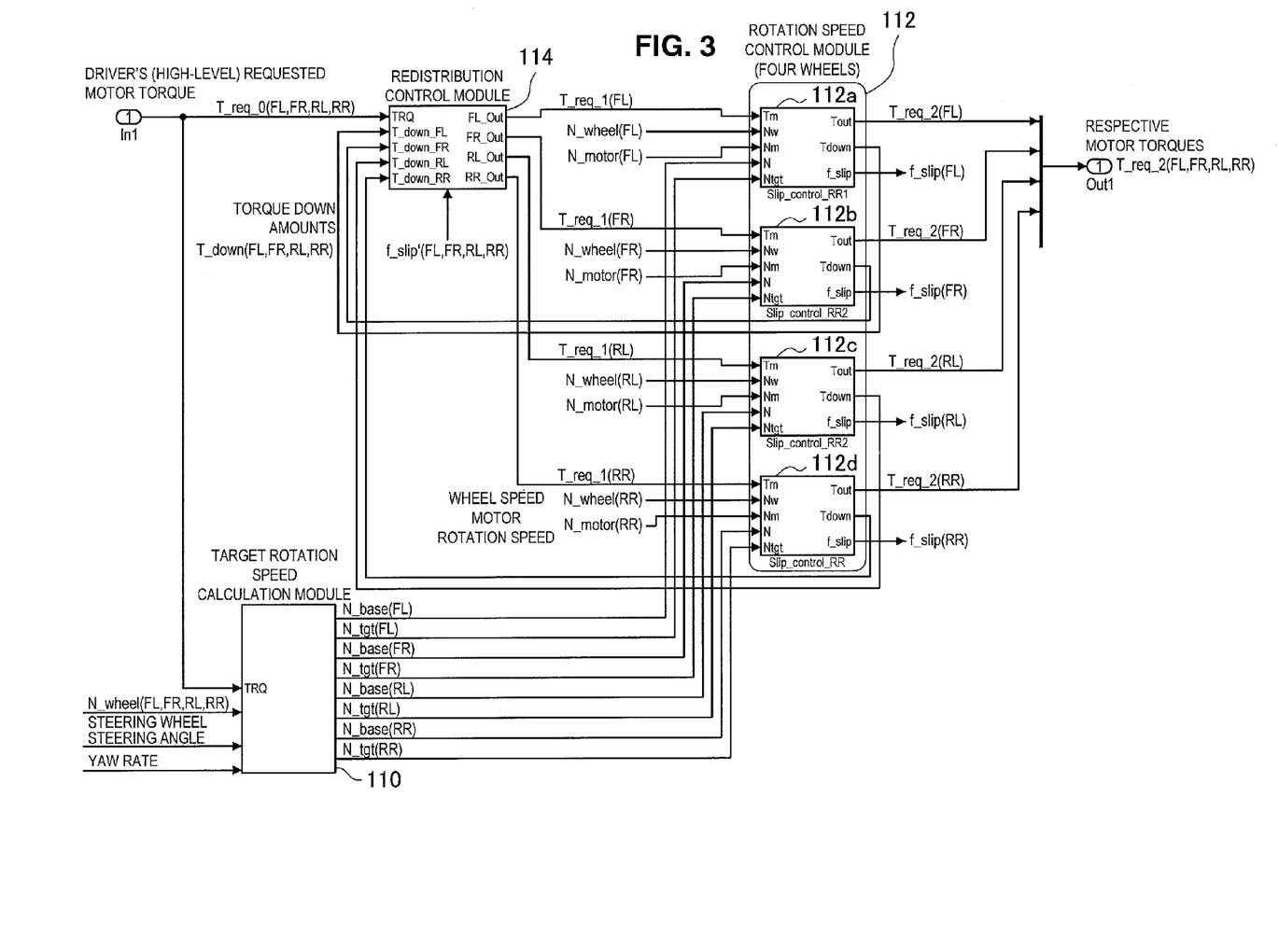
FIG. 3 is a schematic diagram illustrating the configuration related to slip control according to the present implementation in the configuration illustrated in FIG. 2.

FIG. 2 is a schematic diagram illustrating a main configuration of the vehicle control device 100 according to the present implementation. FIG. 3 is a schematic diagram illustrating the configuration related to slip control according to the present implementation in the configuration illustrated in FIG. 2. As illustrated in FIG. 2, the vehicle control device 100 includes a target braking force calculation module 102, a driving torque distribution control module 104, a target yaw rate calculation module 106, a yaw rate control module 108, a target rotation speed calculation module 110, a rotation speed control module 112, and a redistribution control module 114. The vehicle control device 100 converts the driving force from the gear ratio and the tire diameter to the torque, and performs calculation on the basis of a motor axis torque.

In FIG. 2, on the basis of an accelerator position and a braking operation amount, the target braking force calculation module 102 calculates a target braking force. On the basis of the target braking force, the driving torque distribution control module 104 performs feedforward (F/F) control on the distribution of the driving torque of each wheel. Specifically, the torque distribution to front and rear wheels is different in acceleration and deceleration, and thus, the driving torque distribution control module 104 determines an acceleration/deceleration state on the basis of the target braking force to optimally distribute the torques to the front and rear wheels according to the degree of acceleration or deceleration of the vehicle 500. The driving torque distribution control module 104 also optimally distributes the torques to left and right wheels on the basis of a steering wheel steering angle.

On the basis of the steering wheel steering angle, the target yaw rate calculation module 106 calculates a target yaw rate. The yaw rate control module 108 performs feedback (F/B) control on an actual yaw rate with respect to the target yaw rate, the actual yaw rate being detected by the yaw rate sensor 38, and outputs the driving torque of each wheel for making the target yaw rate equal to the actual yaw rate. Thus, in a case where a minute slip is generated by the torques distributed by the driving torque distribution control module 104, the slip can be suppressed by the control of the yaw rate control module 108.

From the driving torque of each wheel obtained by the driving torque distribution control module 104 and the driving torque of each wheel obtained by the yaw rate control module 108, a high-level requested torque T_req_0 corresponding to a driver's requested torque is obtained. The high-level requested torque T_req_0 is obtained for each wheel (FL, FR, RL, RR). Here, FL denotes the front left wheel, FR denotes the front right wheel, RL denotes the rear left wheel, and RR denotes the rear right wheel. The high-level requested torques T_req_0 (FL, FR, RL, RR) are inputted to the redistribution control module 114.

The rotation speed control module 112, the redistribution control module 114, and the target rotation speed calculation module 110 constitute a slip control system according to the present implementation. In the present implementation, in a case where the driving torque of each wheel obtained by the driving torque distribution control module 104 is corrected by the driving torque of each wheel obtained by the yaw rate control module 108, and the motor of each wheel is driven by each of the thus obtained high-level requested torques T_req_0, when a slip is generated on each wheel, the slip control system performs control so that the slip can be surely suppressed. In this slip control system, rotation speed control is independently performed for each wheel, and by using the result, torque redistribution control is performed; thus, the driving force and stability as high as those of a diff-lock are secured. More specifically, the present implementation defines a slip as a state in which the body velocity and the wheel speed deviate from each other, and suppresses separate slipping of each wheel (that is, a differential limiting is executed) so as to secure the driving force and stability.

FIG. 3 is a block diagram specifically illustrating the rotation speed control module 112, the redistribution control module 114, and the target rotation speed calculation module 110. With reference to FIG. 3, the configuration of the vehicle control device 100 according to the present implementation will be described below in detail. The target rotation speed calculation module 110 receives the tire rotation speeds N_wheel (FL, FR, RL, RR) of the respective wheels, the steering wheel steering angle, the yaw rate, and the high-level requested torques T_req_0. The target rotation speed calculation module 110 sets, as a base rotation speed N_base_0, the lowest tire rotation speed among tire rotation speeds N_wheel (FL, FR, RL, RR) of the respective wheels. Note that, when it is determined that regeneration is performed from the high-level requested torque T_req_0, the target rotation speed calculation module 110 sets, as the base rotation speed N_base_0, the highest rotation speed among tire rotation speeds N_wheel (FL, FR, RL, RR) of the respective wheels.

The target rotation speed calculation module 110 calculates base rotation speeds N_base (FL, FR, RL, RR) of the respective wheels on the basis of the base rotation speed N_base_0, the steering wheel steering angle, the yaw rate, and the like. In this case, the target rotation speed calculation module 110 calculates a slipping angle of the body from the base rotation speed N_base_0, the steering wheel steering angle, and the yaw rate, and calculates the base rotation speeds N_base (FL, FR, RL, RR) of the respective wheels from the slipping angle of the body, vehicle parameters (front and rear treads, a wheel base, the distance between the center of gravity the front axle, and a distance between the center of gravity and the rear axle), and the base rotation speed N_base_0. The base rotation speeds N_base (FL, FR, RL, RR) of the respective wheels correspond to the rotation speeds when a slip is not generated, which are used as a base rotation speed for slip determination. In addition, the target rotation speed calculation module 110 calculates target rotation speeds N_tgt (FL, FR, RL, RR) of the respective wheels from the base rotation speeds N_base (FL, FR, RL, RR) of the respective wheels and a target slip ratio. In this case, the target rotation speed calculation module 110 compares, for each wheel, the product obtained by multiplying the base rotation speeds N_base (FL, FR, RL, RR) by the target slip ratio with the sum of the base rotation speeds N_base (FL, FR, RL, RR) and a target rotation difference, and sets the highest value (the lowest value at the time of regeneration) as N_tgt (FL, FR, RL, RR) of each wheel. That is, the target rotation speeds N_tgt (FL, FR, RL, RR) of the respective wheels are target rotation speeds obtained on the assumption that a slip may be generated. The target rotation speed calculation module 110 outputs the calculated base rotation speeds N_base (FL, FR, RL, RR) of the respective wheels and the target rotation speeds N_tgt (FL, FR, RL, RR) of the respective wheels to the rotation speed control module 112.

The redistribution control module 114 receives the high-level requested torque T_req_0. The redistribution control module 114 also receives slip determination flags f_slip' of the respective wheels in the previous control cycle and torque down amounts T_down (FL, FR, RL, RR) of the respective wheels in the previous control cycle. On the basis of the torque down amounts T_down (FL, FR, RL, RR) in the previous control cycle, the redistribution control module 114 redistributes the total value of the torque down amounts to non-slipping wheels so as to control torques of the respective wheels.

Specifically, when at least one wheel is slipping in the previous control cycle, the redistribution control module 114 calculates a total value T_down_total of torque down amounts (previous values) T_down' of the respective slipping wheels. Then, the redistribution control module 114 distributes the torque down amount total value T_down_total to the non-slipping wheels in the current control cycle at a certain ratio, and sets the sum of the distributed torque down amount total value T_down_total and the high-level requested torques T_req_0 of the respective wheels as requested torques T_req_1 of the respective wheels to the rotation speed control module 112. For example, the redistribution control module 114 distributes the torque down amount total value T_down_total equally to the non-slipping wheels in the current cycle, and adds the resulting values to the high-level requested torques T_req_0 of the respective wheels to calculate the requested torques T_req_1 of the respective wheels.

In addition, as for a slipping wheel in the current control cycle, the redistribution control module 114 does not distribute the torque down amount total value T_down_total, and sets the high-level requested torque T_req_0 as the requested torque T_req_1 to the rotation speed control module 112.

The rotation speed control module 112 receives the thus calculated requested torques T_req_1 (FL, FR, RL, RR) of the respective wheels. The rotation speed control module 112 also receives the base rotation speeds N_base (FL, FR, RL, RR) of the respective wheels and the target rotation speeds N_tgt (FL, FR, RL, RR) of the respective wheels, which have been calculated by the target rotation speed calculation module 110. The rotation speed control module 112 further receives the motor rotation speeds N_motor (FL, FR, RL, RR) of the respective wheels and the tire rotation speeds N_wheel (FL, FR, RL, RR) of the respective wheels.

By use of the inputted requested torques T_req_1 (FL, FR, RL, RR) of the respective wheels, target rotation speeds N_tgt (FL, FR, RL, RR) of the respective wheels, base rotation speeds N_base (FL, FR, RL, RR) of the respective wheels, motor rotation speeds N_motor (FL, FR, RL, RR) of the respective wheels, tire rotation speeds N_wheel (FL, FR, RL, RR) of the respective wheels, and the like, the rotation speed control module 112 controls the rotation speed, and outputs the results as final requested torques T_req_2 (FL, FR, RL, RR) of motors of the respective wheels. Accordingly, the rotation speed control module 112 includes a rotation speed control module 112a for calculating the requested torque T_req_2 (FL) of the motor of the front left wheel (FL), a rotation speed control module 112b for calculating the requested torque T_req_2 (FR) of the motor of the front right wheel (FR), a rotation speed control module 112c for calculating the requested torque T_req_2 (RL) of the motor of the rear left wheel (RL), and a rotation speed control module 112d for calculating the requested torque T_req_2 (RR) of the motor of the rear right wheel (RR).

Figure 4:
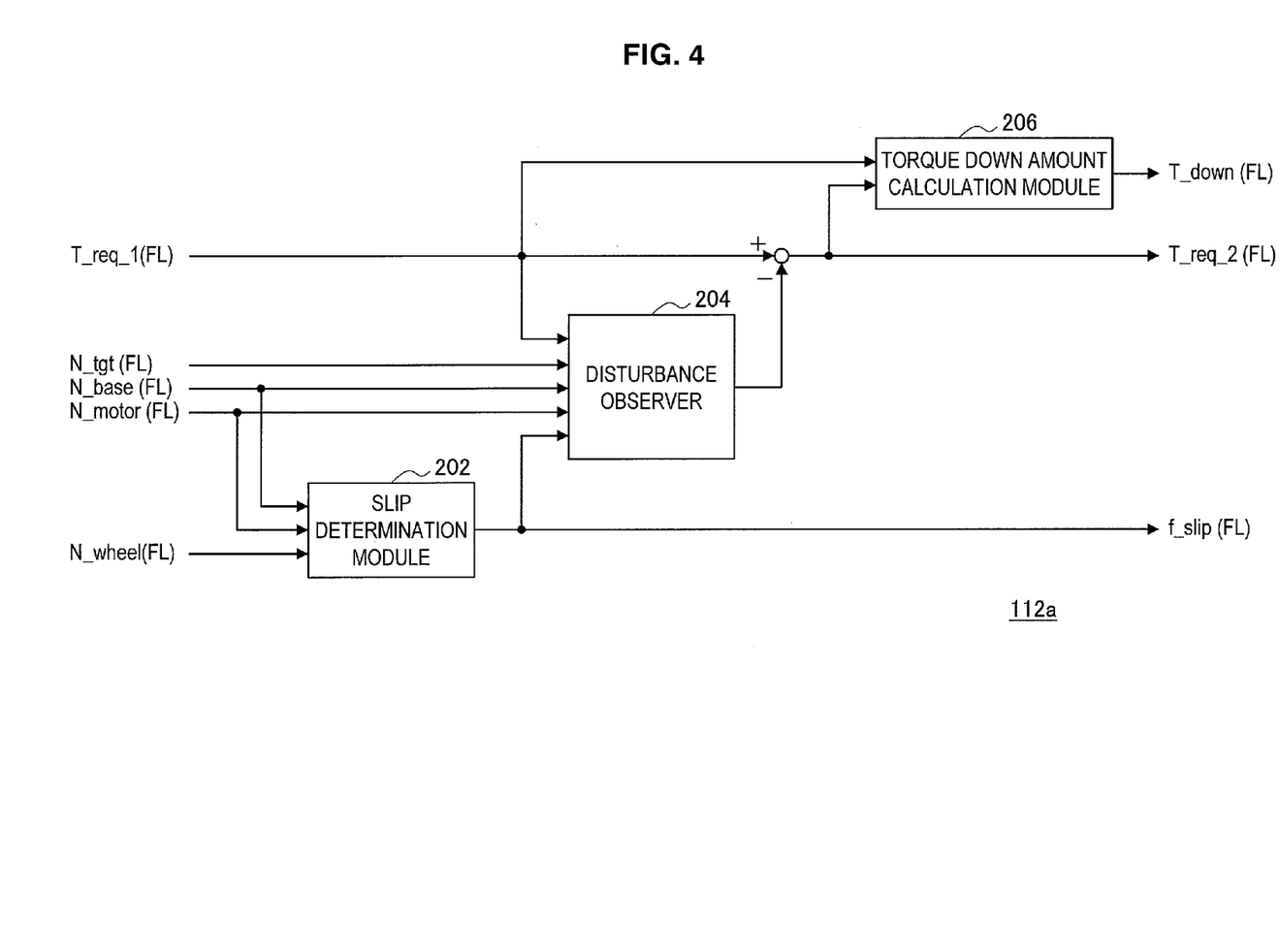
FIG. 4 is a schematic diagram specifically illustrating the configuration of a rotation speed control module.

FIG. 4 is a schematic diagram specifically illustrating the configuration of the rotation speed control module 112a. As illustrated in FIG. 4, the rotation speed control module 112a includes a slip determination module 202, a disturbance observer 204, and a torque down amount calculation module 206. In FIG. 4, control of the front left wheel (FL) is taken as an example. The rotation speed control module 112a receives the requested torque T_req_1 (FL) of the front left wheel, the base rotation speed N_base (FL) of the front left wheel, the target rotation speed N_tgt (FL) of the front left wheel, the motor rotation speed N_motor (FL) of the front left wheel, and the tire rotation speed N_wheel (FL) of the front left wheel. Note that the rotation speed control modules 112*b*, 112*c*, and 112*d* each have the same configuration as the rotation speed control module 112*a*.

The slip determination module 202 of the rotation speed control module 112 performs slip determination on the basis of a deviation degree between the motor rotation speed N_motor (FL) and the base rotation speed N_base (FL). When the front left wheel is slipping, the slip determination module 202 turns on a slip determination flag f_slip (FL) (f_slip (FL)=1). As described above, the base rotation speed N_base (FL) corresponds to the rotation speed when a slip is not generated, and thus, in a case where the base rotation speed N_base (FL) deviates from the motor rotation speed N_motor (FL) by a predetermined value or more, it is determined that a slip is generated. Note that the tire rotation speed N_wheel (FL) of the front left wheel, which is inputted to the slip determination module 202, can be used mainly for slip end determination. In a case where the tire rotation speed N_wheel (FL) equals to or close to the base rotation speed N_base (FL), it can be determined that the slip is under control.

On the basis of the flip determination flag f_slip (FL), in a case where the front left wheel is not slipping, the rotation speed control module 112 outputs the requested torque T_req_1 (FL) of the front left wheel, which has been inputted from the redistribution control module 114, as the final requested torque T_req_2 (FL) of the motor of the front left wheel.

On the basis of the flip determination flag f_slip (FL), in a case where the front left wheel is slipping, the rotation speed control module 112 performs rotation speed control on the requested torque T_req_1 (FL) of the front left wheel, which has been inputted from the redistribution control module 114, and outputs the requested torque T_req_2 (FL) of the motor of the front left wheel. Thus, the rotation speed control module 112 determines the deviation between the target rotation speed N_tgt (FL) and the motor rotation speed N_motor (FL), and performs control so that the motor rotation speed N_motor (FL) can be equal to the target rotation speed N_tgt (FL).

Specifically, the torque down amount from the requested torque T_req_1 (FL) is computed by using the disturbance observer 204 so that the motor rotation speed N_motor (FL) can be equal to the target rotation speed N_tgt (FL). The thus obtained torque down amount is subtracted from the requested torque T_req_1 (FL), and the requested torque T_req_2 (FL) is outputted. In this case, because the motor rotation speed N_motor (FL) varies easily, motor inertia is calculated from a wheel angular acceleration obtained from the wheel speed N_wheel (FL). On the basis of the base rotation speed N_base (FL), which is more stable with respect to variation, the torque down amount is calculated so as to cancel the variation in the angular acceleration. In this manner, the variation in the rotation speed can be suppressed. The motors of the respective wheels are controlled by the motor torques T_req_2 (FL, FR, RL, RR) after the rotation speed control.

The torque down amount calculation module 206 calculates the torque down amount T_down (FL) from the difference between the obtained final requested torque T_req_2 (FL) and the requested torque T_req_1 (FL).

In the above manner, the rotation speed control module 112 independently controls the motors of the respective wheels, and limits the motor rotation speeds of the respective wheels. In this manner, compared with a case where control is performed by torque, the vibration of motors can be suppressed surely, and the responsibility and stability of control can be enhanced. In addition, redistribution control is performed independently of the rotation speed control, and the redistribution control module 114 is installed at a higher level than the rotation speed control module 112. Thus, while the rotation speed control is being performed, torque redistribution can be controlled, and while the vibration of the motors is suppressed, torque can be distributed surely. Furthermore, the redistribution results obtained by the redistribution control module 114 are set as the requested torques to the rotation speed control module 112. In this manner, a slip or vibration due to redistribution can be suppressed by the rotation speed control. Thus, torque can be redistributed without setting the upper limit on the torque, and reduction in driving force can be suppressed surely. Accordingly, it becomes possible to increase drivability without limiting a differential limiting function and to increase drivability even when there is no upper limit on the torque.

Meanwhile, redistribution control after the rotation speed control may lead to variation in torques due to redistribution, and the motors may vibrate. However, as in the present implementation, by performing the rotation speed control after redistribution, the motors do not vibrate and stable control becomes possible.

Figure 5:
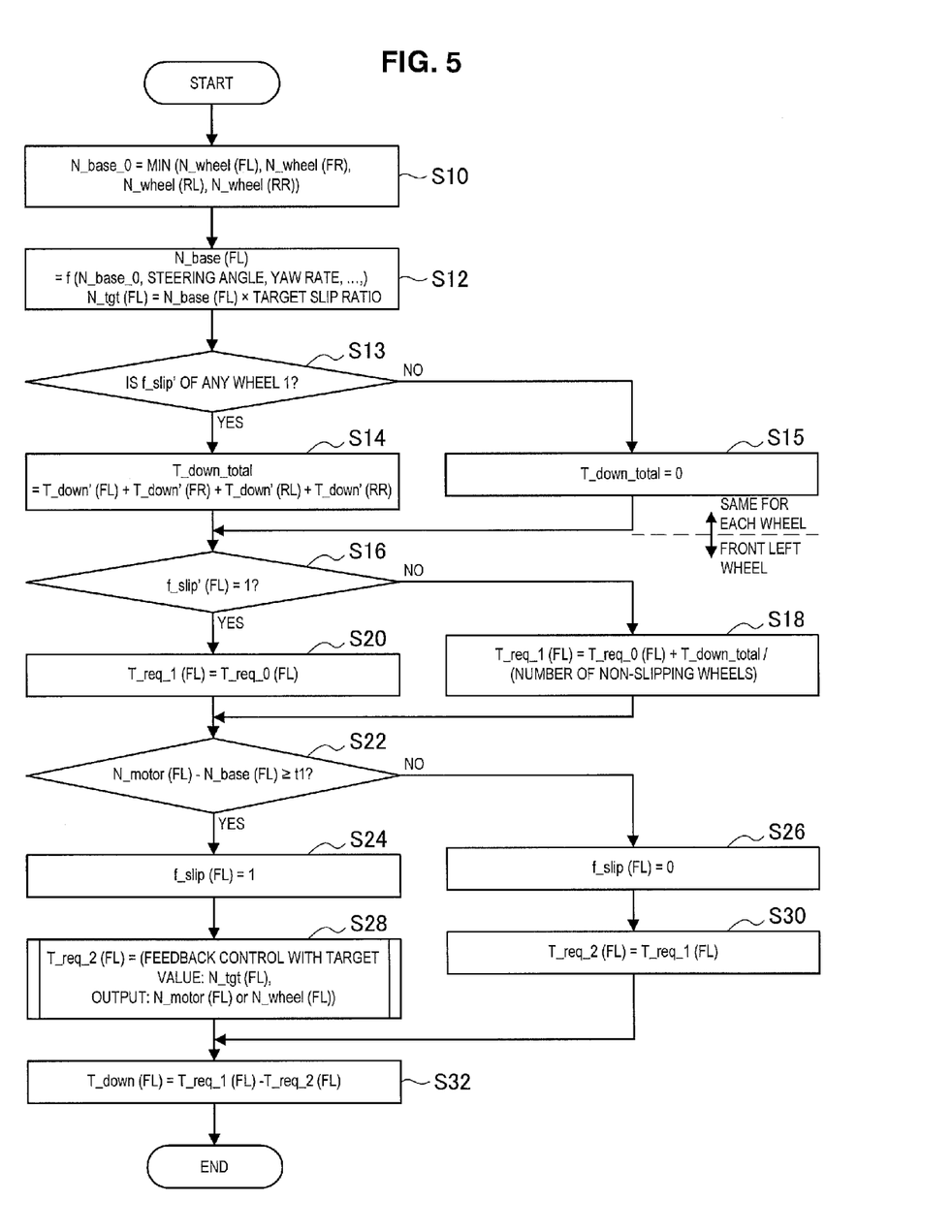
FIG. 5 is a flowchart illustrating a processing procedure in a vehicle control device according to the present implementation.

Next, on the basis of a flowchart illustrated in FIG. 5, a processing procedure in the vehicle control device 100 according to the present implementation will be described. Although FIG. 5 takes slip control of the front left wheel as an example, the other wheels are controlled in the same manner. First, in a step S10, the rotation speed of a wheel having the lowest tire rotation speed (a wheel having the highest tire rotation speed at the time of regeneration) of the four wheels is set as the base rotation speed N_base_0. The base rotation speed N_base_0 is calculated from the following expression.

$$N\_base\_0 = MIN(N\_wheel(FL), N\_wheel(FR), N\_wheel(RL), N\_wheel(RR))$$

In the next step, a step S12, on the basis of the base rotation speed N_base_0, the steering wheel steering angle, the yaw rate, and the like, the base rotation speeds N_base of the respective wheels and the target rotation speeds N_tgt of the respective wheels are set. The base rotation speed N_base (FL) of the front left wheel and the target rotation speed N_tgt (FL) of the front left wheel are calculated from the following expressions, respectively. Here, f is a predetermined function.

$$N\_base(FL) = f(N\_base\_0, \text{steering angle}, \text{yaw rate}, \ldots,)$$

$$N\_tgt(FL) = N\_base(FL) \times \text{target slip ratio}$$

In the next step, a step S13, with reference to the previous flip determination flag (the value in the previous control cycle) f_slip' for determining whether a slip is generated on each wheel, it is determined whether or not at least one wheel is slipping. When at least one wheel is slipping, the processing proceeds to a step S14. In the step S14, the total value T_down_total of the torque down amounts (the previous values) T_down' of the respective wheels is calculated on the basis of the following expression. Note that the torque down amounts (the previous values) T_down' of non-slipping wheels (f_slip'=0) in the previous control cycle are 0.

$$T\_down\_total = T\_down'(FL) + T\_down'(FR) + T\_down'(RL) + T\_down'(RR)$$

On the other hand, when none of the wheels is slipping in the step S13, the processing proceeds to a step S15. In the step S15, the total value T_down_total of the torque down amounts (the previous values) T_down' of the respective wheels is set to 0 (T_down_total=0).

After the steps S14 and S15, the processing proceeds to a step S16. In the step S16, with reference to the previous flip determination flag f_slip'(FL) of the front left wheel, it is determined whether or not the front left wheel is slipping. When the front left wheel is not slipping (f_slip'(FL)≠1), the processing proceeds to a step S18. In the step S18, the torque down amount total value T_down_total is distributed to the non-slipping front left wheel at a certain ratio, and sets the sum of the distributed torque down amount total value T_down_total and the high-level requested torque T_req_0 (FL) as the requested torque T_req_1 (FL) to the rotation speed control module 112. For example, the torque down amount total value T_down_total is distributed equally to all of the non-slipping wheels. In this case, the requested torque T_req_1 (FL) of the front left wheel is calculated from the following expression. In this manner, driving is performed by compensating the torque down amount of the slipping wheel by the non-slipping wheels.

$$T\_req\_1(FL)=T\_req\_0(FL)+T\_down\_total/(\text{number of non-slipping wheels})$$

Note that, when the number of non-slipping wheels is 0 in the above calculation, zero division is prevented.

On the other hand, when the front left wheel is slipping in the step S16 (f_slip'(FL)=1), the processing proceeds to a step S20. In the step S20, the requested torque T_req_1 (FL) of the front left wheel is set to the high-level requested motor torque T_req_0 (FL). In this manner, when the front left wheel is slipping, compensation by the torque down amounts is not performed.

After the steps S18 and S20, the processing proceeds to a step S22. In the step S22, the actual rotation speed (motor rotation speed) N_motor (FL) of the front left wheel and the base rotation speeds N_base (FL) are compared with each other, and it is determined whether or not the difference therebetween is a threshold t1 or more (N_motor (FL)−N_base (FL)>t1). When the difference between the actual rotation speed N_motor (FL) and the base rotation speeds N_base is the threshold t1 or more, it is determined that the front left wheel is slipping, and the processing proceeds to a step S24. In the step S24, the slip determination flag f_slip (FL) is turned on (f_slip (FL)=1).

After the step S24, the processing proceeds to a step S28. In the step S28, by use of the requested torque T_req_1 (FL), the target rotation speed N_tgt (FL) of the front left wheel, the motor rotation speeds N_motor (FL) of the front left wheel, and the tire rotation speed N_wheel (FL) of the front left wheel, which have been obtained in the step S18 or S20, the rotation speed control (feedback control) is performed, and the resulting value is set as the final requested torque T_req_2 (FL) of the motor of the front left wheel. Note that the details of the rotation speed control by the rotation speed control module 112 are as described above.

On the other hand, when the difference between the actual rotation speed N_motor (FL) and the base rotation speeds N_base (FL) is smaller than the threshold t1 in the step S22, it is determined that the front left wheel is not slipping, and the processing proceeds to a step S26. In the step S26, the slip determination flag f_slip (FL) is turned off (f_slip (FL)=0).

After the step S26, the processing proceeds to a step S30. In the step S30, the requested torque T_req_2 (FL) is set as the requested torque T_req_1 (FL) after redistribution, which has been obtained in the step S18 or S20. In this manner, when a slip is not generated, the requested torque T_req_2 (FL) obtained by the rotation speed control is regarded as being identical with the requested torque T_req_1 (FL) after redistribution.

After the steps S28 and S30, the processing proceeds to a step S32. In the step S32, as for the front left wheel, from the difference between the requested torque T_req_1 (FL) after redistribution and the requested torque T_req_2 (FL) of the motor, the torque down amount T_down (FL) is obtained (T_down (FL)=T_req_1 (FL) −T_req_2 (FL)). The torque down amount T_down (FL) obtained here is used for calculation of the total value T_down_total of the torque down amounts (the previous values) T_down' of the respective wheels in the step S14 in the following control cycle. Note that, when a slip is generated, the requested torque T_req_2 (FL) obtained by the rotation speed control becomes identical with the requested torque T_req_1 (FL) after redistribution, and accordingly, the torque down amount T_down (FL) becomes 0.

Figure 6:
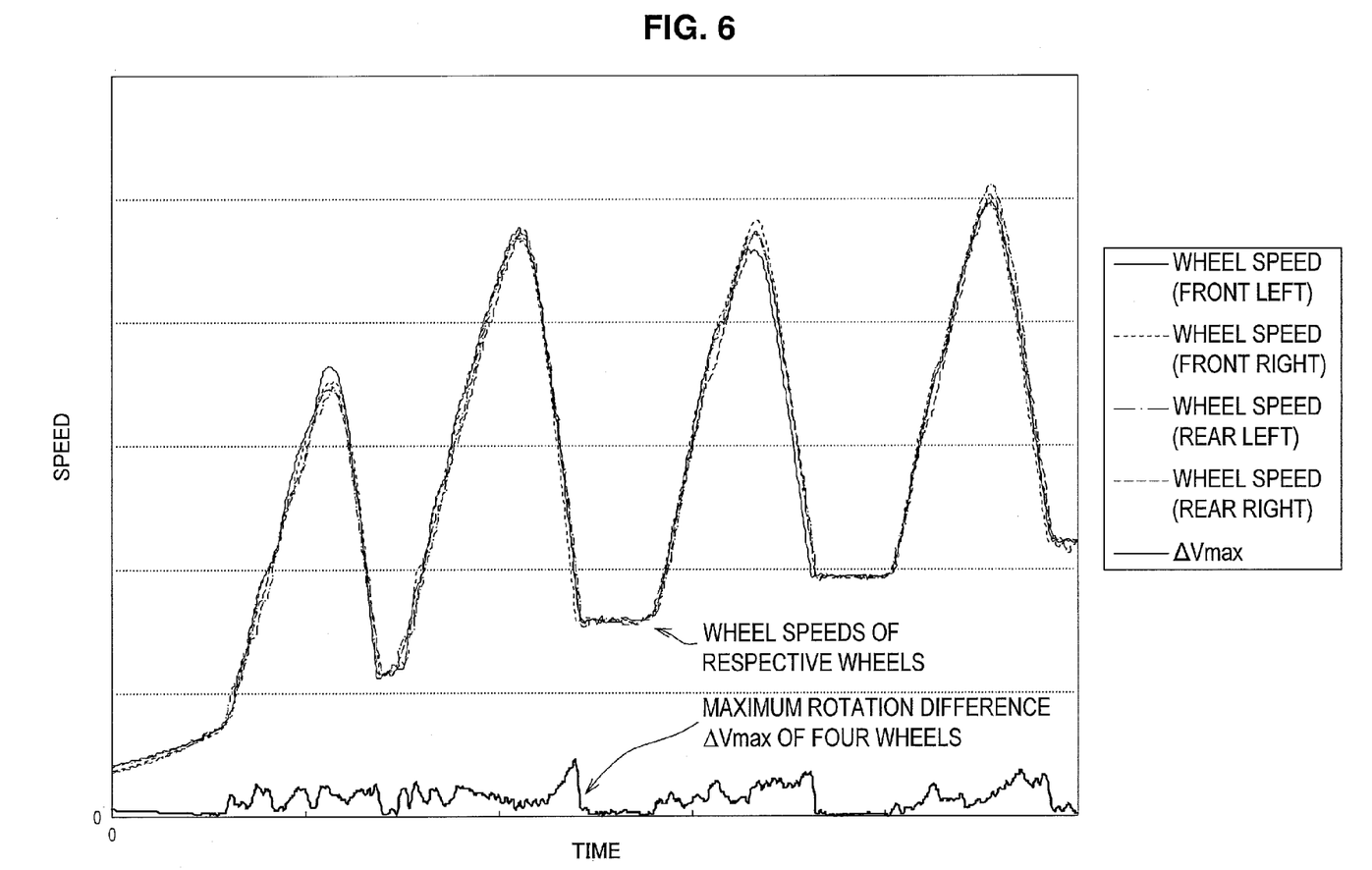
FIG. 6 is a characteristic diagram illustrating wheel speeds of the respective wheels when a vehicle according to the present implementation accelerates from a standstill by full throttle acceleration on a road surface with a low load surface friction factor (low-μ)

FIG. 6 is a characteristic diagram illustrating the wheel speeds (tire rotation speeds N_wheel) of the respective wheels and the largest difference (maximum rotation difference ΔVmax) of the wheel speeds of the respective wheels when the vehicle 500 according to the present implementation accelerates from a standstill by full throttle acceleration on a road surface with a low load surface friction factor (low-μ). Redistribution control according to the present implementation is performed as illustrated in FIG. 6, and thus, the driving force is distributed appropriately to the respective wheels and the wheel speed (the front left wheel), the wheel speed (the front right wheel), the wheel speed (the rear left wheel), and the wheel speed (the rear right wheel) are substantially equal to each other. In addition, the maximum rotation difference ΔVmax is kept low. Accordingly, it is possible to suppress the generation of rotation differences of the respective wheels without vibrating the body, and also it is possible to secure the driving force on the low-μroad surface surely.

Figure 7:
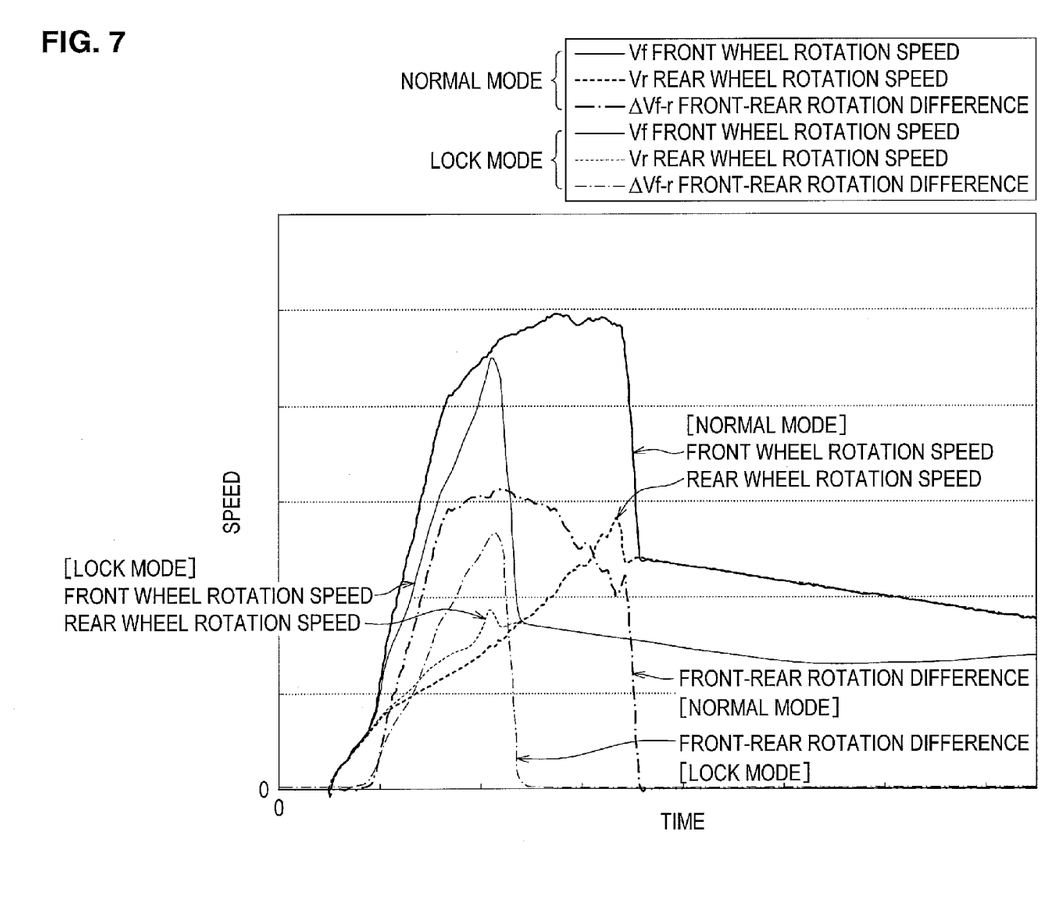
FIG. 7 is a characteristic diagram illustrating wheel speeds of the respective wheels when a conventional technique is used for acceleration from a standstill by full throttle acceleration on a road surface with a low load surface friction factor (low-μ), as in FIG. 6.

On the other hand, FIG. 7 is a characteristic diagram illustrating the wheel speeds (tire rotation speeds N_wheel) of the respective wheels when the above described technique disclosed in JP-A H10-295004 is used for acceleration from a standstill by full throttle acceleration on a road surface with a low load surface friction factor (low-μ), as in FIG. 6. The example in FIG. 7 illustrates two modes: a normal mode in which the torque transfer amount between a pair of front wheels and a pair of rear wheels is small; and a lock mode in which the torque transfer amount between the pair of front wheels and the pair of rear wheels is large.

As illustrated in FIG. 7, the rotation difference between the pair of front wheels and the pair of rear wheels is smaller in the lock mode than in the normal mode. However, in either mode, the rotation speeds of the front wheels are significantly increased by acceleration from a standstill, while the rotation speeds of the rear wheels are slightly increased. Thus, a rotation difference is generated between the pair of front wheels and the pair of rear wheels. Accordingly, it is revealed that wheelspin occurs on the front wheels, and that the driving forces of the front wheels are not distributed sufficiently to the rear wheels. Therefore, the rotation difference between the pair of front wheels and the pair of rear wheels cannot be under control, resulting in a lack of driving force.

Figure 8:
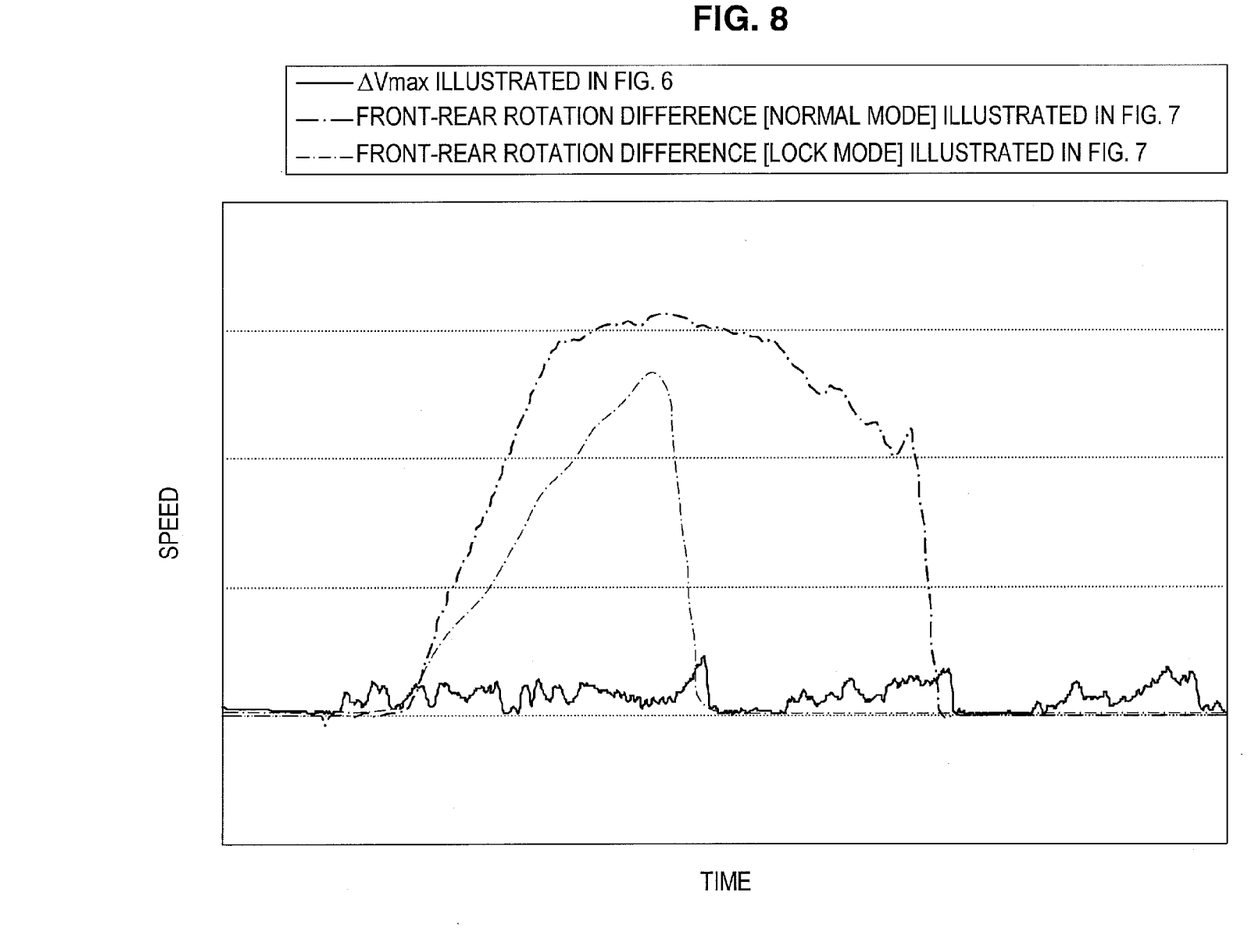
FIG. 8 is a characteristic diagram illustrating a maximum rotation difference of four wheels illustrated in FIG. 6 in comparison with a rotation difference between a pair of front wheels and a pair of rear wheels illustrated in FIG. 7.

FIG. 8 is a characteristic diagram illustrating the control of the present implementation illustrated in FIG. 6 in comparison with the control of the related art illustrated in FIG. 7. In FIG. 8, the maximum rotation difference ΔVmax illustrated in FIG. 6 is illustrated with the rotation difference between the pair of front wheels and the pair of rear wheels (the normal mode and the lock mode) in a superimposed manner. In the control of the present implementation illustrated in FIG. 6, as compared with the control of the related art illustrated in FIG. 7, there is no substantial rotation difference among the front and rear, left and right wheels as illustrated in FIG. 8, and thus, it is possible to suppress a slip of each wheel effectively. Accordingly, the driving force can be distributed appropriately and secured.

As described above, according to the present implementation, the torque down amount of the slipping wheel is redistributed to the non-slipping wheels; thus, it becomes possible to suppress the generation of rotation differences of the respective wheels highly precisely, and to suppress a decrease in driving force. In addition, the redistribution control is performed independently of the rotation speed control, and the rotation speed control is performed after the redistribution control. Consequently, it becomes possible to perform the redistribution control of torques while performing the rotation speed control, and to distribute torques surely while the motor vibration is suppressed. Accordingly, it becomes possible to suppress the generation of rotation differences of the respective wheels without the generation of vibration and to redistribute torques without limitation, and the suppression of vibration leads to the suppression of variation in rotation speeds of the respective wheels without degrading drivability. Therefore, the suppression of variation in rotation speeds of the respective wheels can result in stable vehicle behavior and the redistribution of torques can result in securing the driving force as much as possible. As described above, according to the present disclosure, in a system that drives the respective wheels independently, the generation of a slip can be suppressed on each wheel and motor and tire vibrations can be suppressed so as to increase the drivability.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A vehicle control device, comprising:
   motors that respectively drive wheels independently;
   wheel speed sensors that detect rotation speeds of each of the wheels;
   motor rotation speed sensors that detect rotation speeds of the motors corresponding to each of the wheels;
   a slip determination module configured to set, as a base rotation speed, a lowest rotation speed of the rotation speeds of each of the wheels detected by the wheel speed sensors, the slip determination module being further configured to execute slip determination on each of the wheels on the basis of at least the base rotation speed and the rotation speeds of the motors corresponding to each of the wheels;
   a rotation speed control module configured to execute torque down in a manner that the rotation speed of one or more slipping wheels of the wheels becomes equal to one or more target rotation speeds on the basis of at least a result of the slip determination by the slip determination module, the rotation speed control module being further configured to calculate requested torques of the motors that drive the wheels on the basis of at least redistributed torques; and
   a redistribution control module configured to calculate the redistributed torques by redistributing a torque down amount of the one or more slipping wheels to non-slipping wheels of the wheels.

2. The vehicle control device according to claim 1, further comprising:
   a target rotation speed calculation module configured to calculate the target rotation speed of each of the wheels on the basis of at least the base rotation speed, a steering wheel steering angle, a yaw rate, and a target slip ratio.

3. The vehicle control device according to claim 1, further comprising:
   a torque down amount calculation module configured to calculate the torque down amount of the slipping wheel based on at least a difference between the requested torques and the redistributed torques.

4. The vehicle control device according to claim 1, wherein the redistribution control module is further configured to obtain torques of each of the wheels obtained from a target braking force, calculate the redistributed torques of the non-slipping wheel based on at least an addition of the torque down amount to the torques of each of the wheels obtained from the target braking force, and set, as the redistributed torques of the slipping wheel, the torques of the each of the wheels obtained from the target braking force.

5. The vehicle control device according to claim 4, wherein the redistribution control module is further configured to calculate the redistributed torques of the non-slipping wheel based on at least an equal redistribution, to the non-slipping wheel, a value obtained based on at least a division of a total value of the torque down amount of the slipping wheel by a number of the one or more slipping wheels.

6. A vehicle control method, comprising:
   detecting rotation speeds of wheels of a vehicle driven by respective motors independently;
   setting, as a base rotation speed, a lowest rotation speed of the detected rotation speeds of each of the wheels, and executing slip determination on each of the wheels on the basis of at least the base rotation speed and the rotation speeds of the motors corresponding to each of the wheels;
   executing torque down in a manner that the rotation speed of one or more slipping wheel of the wheels becomes equal to one or more target rotation speeds on the basis of at least a result of the slip determination, and calculating requested torques of the motors that drive each of the wheels on the basis of at least redistributed torques; and
   calculating the redistributed torques by redistributing a torque down amount of the one or more slipping wheels to non-slipping wheels of the wheels.

* * * * *